(12) United States Patent
Broadhurst et al.

(10) Patent No.: US 10,666,713 B2
(45) Date of Patent: May 26, 2020

(54) EVENT PROCESSING

(71) Applicant: INTERNATIONAL BUSINESS MACHINES CORPORATION, Armonk, NY (US)

(72) Inventors: Peter A. Broadhurst, Eastleigh (GB); John Hosie, Eastleigh (GB); Robert B. Nicholson, Southsea (GB); Robert W. Phippen, Romsey (GB); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 15/471,085

(22) Filed: Mar. 28, 2017

(65) Prior Publication Data
US 2018/0287969 A1     Oct. 4, 2018

(51) Int. Cl.
*H04L 12/58*     (2006.01)
*H04L 29/08*     (2006.01)

(52) U.S. Cl.
CPC .............. *H04L 67/10* (2013.01); *H04L 51/14* (2013.01); *H04L 67/26* (2013.01)

(58) Field of Classification Search
CPC ..... H04L 43/04; H04L 47/10; H04L 47/2441; H04L 63/00; G06F 8/00; G06F 17/5022; G06F 15/16
USPC .............................. 709/206, 224, 236; 726/3
See application file for complete search history.

(56) References Cited

U.S. PATENT DOCUMENTS

| | | | |
|---|---|---|---|
| 5,335,324 A * | 8/1994 | Orimo ................. | G06F 11/0763 709/201 |
| 6,223,064 B1 * | 4/2001 | Lynn ................... | A61B 5/14551 600/324 |
| 8,671,306 B2 | 3/2014 | Paramasivam et al. | |
| 8,966,039 B1 * | 2/2015 | Fultz ...................... | H04L 67/16 709/223 |
| 9,053,162 B2 | 6/2015 | Shutt et al. | |
| 9,331,968 B2 | 5/2016 | Cuomo et al. | |
| 2004/0191406 A1 * | 9/2004 | Crum .................... | B05B 12/122 427/8 |
| 2006/0243643 A1 * | 11/2006 | Scott .................. | B01D 33/0376 209/309 |

(Continued)

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Tesfay Yohannes
(74) *Attorney, Agent, or Firm* — Michael A. Petrocelli, Esq.; Kevin P. Radigan, Esq.; Heslin Rothenberg Farley & Mesiti P.C.

(57) ABSTRACT

A facility for processing an event of a distributed processing environment is provided. The facility includes separating a plurality of processing flows into a plurality of flow groups, each flow group having a respective identifier. The identifier of each flow group is then associated with a respective topic. Based on the occurrence of an event, a message having a topic based on the event is published along with the identifier of the flow group associated with the topic. A processing flow of the flow group having the identifier of the message may then be used to process the event.

20 Claims, 4 Drawing Sheets

(56) References Cited

U.S. PATENT DOCUMENTS

| | | | |
|---|---|---|---|
| 2010/0205589 A1* | 8/2010 | Biggerstaff | G06F 8/43 717/150 |
| 2011/0055426 A1* | 3/2011 | Lakshmanan | G06F 9/5066 709/242 |
| 2014/0215560 A1* | 7/2014 | Roberson | H04L 63/02 726/3 |
| 2014/0273994 A1 | 9/2014 | Upendran et al. | |
| 2015/0081885 A1* | 3/2015 | Thomas | G06F 9/45558 709/224 |
| 2015/0117454 A1* | 4/2015 | Koponen | H04L 61/2532 370/392 |
| 2015/0135197 A1* | 5/2015 | Budai | G06F 9/542 719/315 |
| 2015/0229545 A1* | 8/2015 | Cheung | G06F 8/00 709/224 |
| 2016/0110812 A1* | 4/2016 | Mun | G06Q 40/06 705/36 R |
| 2018/0287969 A1* | 10/2018 | Broadhurst | H04L 67/10 |

OTHER PUBLICATIONS

Sharma, Abhishek, "Apache Kafka: Next Generation Distributed Messaging System", http://www.infoq.com, Jun. 4, 2014 (16 pages).

\* cited by examiner

EVENT PROCESSING

BACKGROUND

The present invention relates to the field of processing events such as events in distributed processing environments.

Distributed processing systems and applications typically require a level of integration between applications. For instance, it is often required to perform an action with one application whenever an event occurs with another application. An integration flow is a typical way to express the action that should happen whenever a certain trigger occurs.

In traditional computing, specific hardware would be employed for the purpose of processing this integration. In a distributed processing system (such cloud computing environments, for example) it is typically advantageous for one entity to provide, as a service, the processing of the integration flows. As a provider of an Integration Software as a Service (iSaaS), there is a desire to provide maximum quality of service (e.g. in terms of throughput and latency) with minimal costs. Costs are incurred in the form of: (i) operational costs associated with provisioning the processing resources and associated services; and (ii) development costs associated with developing the software; and (iii) maintenance costs.

SUMMARY

According to one or more aspects of the present invention, a computer-implemented method is provided for processing an event of a distributed processing environment, the distributed processing environment including a flow engine adapted to implement a plurality of processing flows. The method includes separating the plurality of processing flows in a plurality of flow groups, each flow group having a respective identifier. The identifier of each flow group is associated with a respective topic. In response to the occurrence of an event in an application or service, the method publishes a message having a topic based on the event, the message including the identifier of the flow group associated with the topic. A processing flow of the flow group having the identifier of the message is used to process the event.

Computer program products and systems relating to one or more aspects disclosed herein are also described and claimed herein. Further, services relating to one or more aspects are also described and may be claimed herein.

Additional features and advantages are realized through the techniques of the present invention. Other embodiments and aspects are described in detail herein and are considered a part of the claimed aspects.

BRIEF DESCRIPTION OF THE DRAWINGS

Embodiments of the present invention are described below, by way of example only, with reference to the drawings, in which.

DETAILED DESCRIPTION

It should be understood that the figures are merely schematic and are not drawn to scale. It should also be understood that the same reference numerals are used throughout different figures indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (event processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The present invention seeks to provide a method for processing events that can provide support for integrating applications or services in scalable service architectures (e.g. a cloud computing environment). The present invention further seeks to provide a computer program product including computer program code for implementing the method when executed on a processor of a data processing system. The present invention yet further seeks to provide a processing system adapted to execute this computer program code.

Disclosed herein, in one or more aspects, is a method for providing integration between applications at reduced cost while maintaining or maximizing quality of service. For example, one or more embodiments may enable an iSaaS implementer to optimize the use of application runtimes and a messaging service in a way that minimizes a cost per user while maximizing a quality of service for each user. It may also have flexibility to provide improved (e.g. higher quality of service for users who pay more (e.g. an additional fee or 'premium').

By grouping processing flows into flow groups, an identifier of each flow group may be associated with a respective topic. By maintaining a simple registry or store of topics, a messaging system may be used to transmit messages in response to an event, wherein a message topic is based on the event and the message also includes the identifier associated with the topic. A placement controller may then deploy a flow of the flow group having the identifier of the message so as to process the event. In this way, a flow engine may be deployed in a highly scalable topology through mapping of flow groups to message topics service (based on association or generating of a topic with the flow group identifier for example).

One or more embodiments may therefore use a messaging system to pass an identifier of a processing flow (otherwise known as an integration flow, an integration, business logic, integration module, etc.) for processing an event alongside the event itself. In this way, a target flow can be stateless and highly scalable. When a target processing engine (which may implement one or more flow groups for example) is identified, the event and identifier may be used to first look up the processing flow on-demand and then execute that processing flow with the event as input. Passing the identifier as part of a message payload may create logical sub-topics that mean a single messaging system topic can be used per target flow group (rather than a single topic per target processing flow) which reduces cost for messaging systems that charge per topic for example.

Illustrative embodiments may therefore provide methods wherein a messaging topic may be mapped to an identifier of a flow group (based on association or configuration of the messaging engine for example). By mapping a message topic to an associated identifier, a target processing flow (or flow engine) may be general purpose and may not need any prior knowledge of which messages it will process. Instead, the target processing flow (or flow engine) may obtain everything they need to execute 'just-in-time' when the message arrives. Disclosed processes may thus combine messaging and placement with a system where any flow (or engine) can process any request to support a range of isolation and scale requirements in a single multi-tenant platform (with reliable asynchronous delivery of events). Dynamic and scalable event processing may therefore be provided by one or more embodiments disclosed herein.

For instance, one or more aspects may support a transition to micro-services by enabling existing engines to not require prior knowledge of messages they will process. They may, for example, be agnostic of a type of application service. In such circumstances, one or more embodiments may employ identifiers which are mapped to message topics so that event messages can be placed dynamically and independently. By way of example, a placement controller may be implemented which may independently control: mapping of event streams; mapping of multiple event streams onto individual topics; and/or the size of the pool of flow group (engines) for processing each topic.

One or more embodiments may be at least partly based on the realization that a messaging system may be used to pass an identifier for a processing flow along with (e.g. as part of, inside, associated with, or linked to) a message so that a target flow/engine can be stateless and scalable.

One or more embodiments may employ a concept of associating messaging topics with respective flow groups (using unique identifier, UIDs, for example) which are each configured to run a number of processes that may be indistinguishable from each (with respect to one or more properties for example). When an event occurs, a message may be published to a message topic. The message engine may also match the topic with its associated identifier and provide the message with its associated identifier (e.g. in the message header or payload). Also, some event data may be provided in the message for facilitating execution. A processing engine may then receive the message, extract the identifier and look up the processing flow group and execute the processing flow.

In some embodiments, a messaging topic may include identification information of a flow group associated with the messaging topic. In this way, messages may specify a flow identifier (e.g. ID) that should be used to process it. This may have the advantage of not requiring a messaging engine and/or processing engine to know topic-to-flow mappings. In other words, message topics employed by one or more embodiments may be configured to include all the information required to provision a flow group and disclosed herein the event.

Many different ways to determine flow groups for processing an event may be employed by one or more embodiments, and these may be implemented in isolation or in combination. Modifications and additional steps to a traditional event processing systems may also be used which may enhance the value and utility of the inventive aspects disclosed herein.

Illustrative embodiments may be utilized in many different types of event processing environments. Illustrative embodiments may, for example, be employed in relation to stateless and scalable cloud-based applications for event processing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
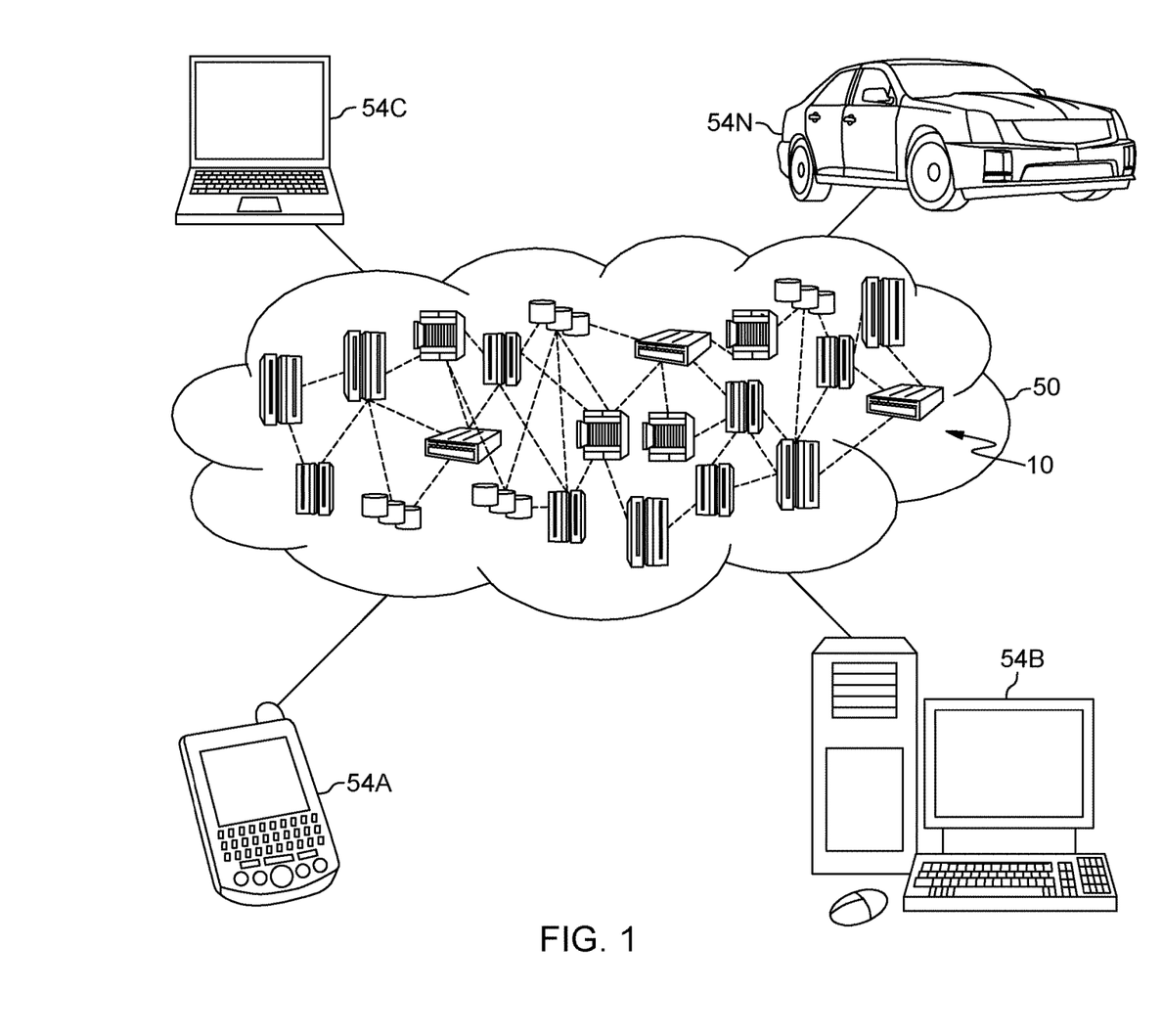
FIG. 1 depicts a cloud computing environment which may implement one or more aspects of event processing according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
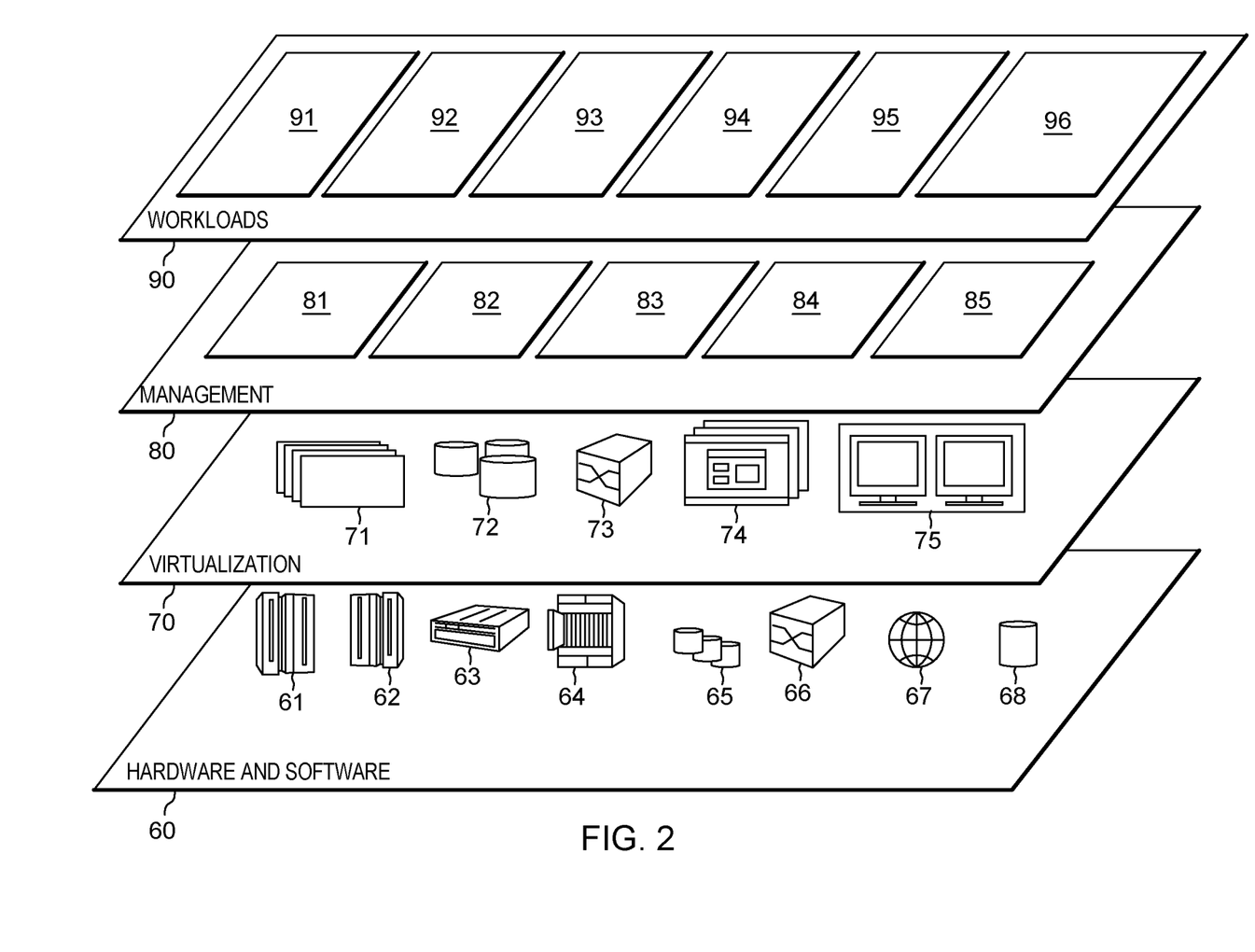
FIG. 2 depicts abstraction model layers, which may facilitate implementing event processing, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Event processing 85 provides event processing according to proposed embodiments.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event processing 96.

One or more aspects disclosed herein enhance an event processing system by reducing costs per user while maximizing quality of service. Embodiments may also enable flexibility to provide higher qualities of service for particular users (e.g. user paying an additional fee). Such proposals can extend or improve the processing capabilities or efficiency of a iSaaS system or component.

Figure 3:
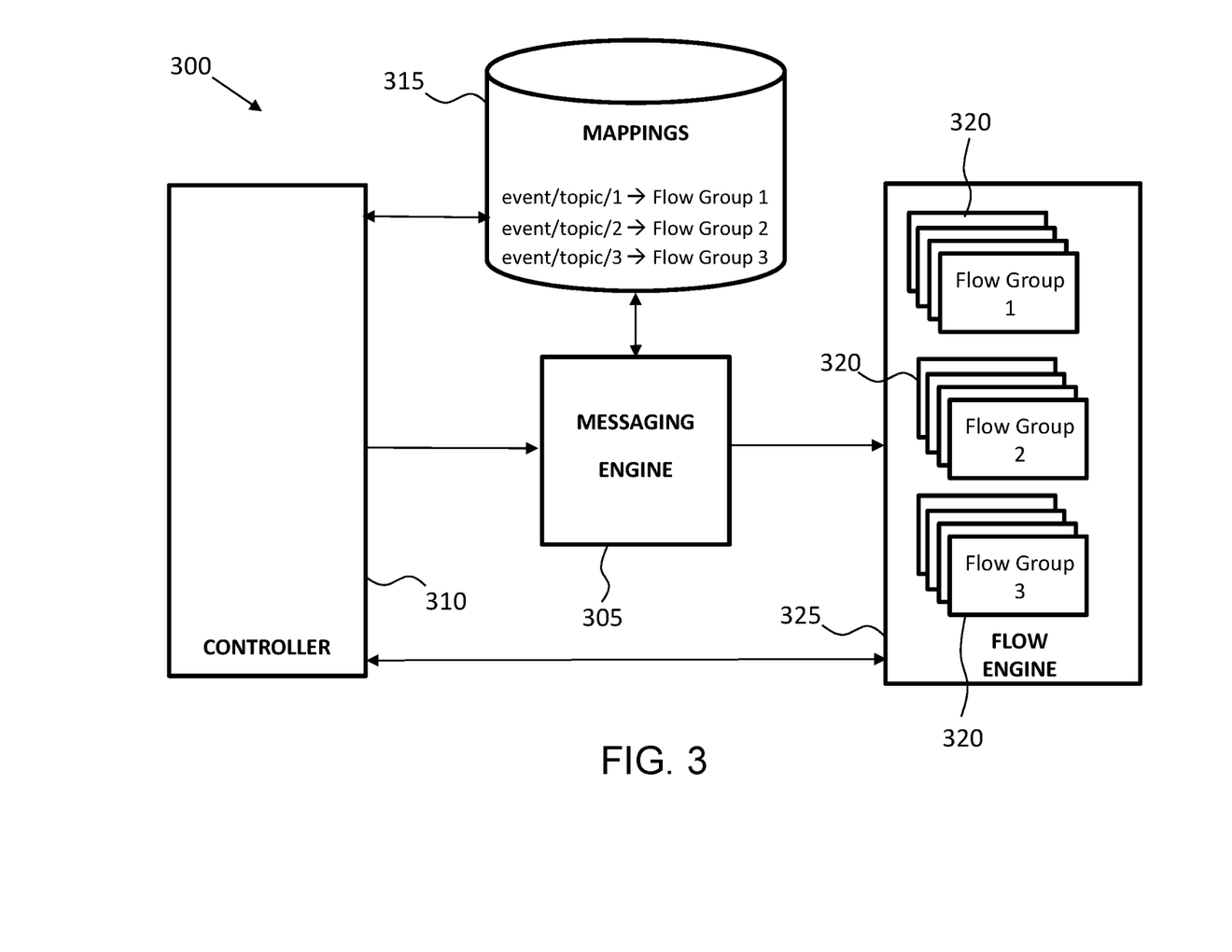
FIG. 3 is a schematic diagram of a system, according to one or more aspects of the present invention.

FIG. 3 is a schematic diagram of a system according to embodiment. The system 300 may be adapted for event processing within a distributed processing environment including a flow engine 325 adapted to implement a plurality of processing flows 320. The system 300 may provide for the processing of events when provisioning services and/or applications via a cloud computing environment for example.

The system 300 includes: a messaging engine/system 305; a controller 310; a database 315 including information representative of associations of message topics with identifiers; and a processing arrangement 325 (or flow engine).

The controller 310 may be adapted to separate the plurality of processing flows in a plurality of flow groups, each flow group having a respective identifier. By way of example, the controller 310 may identify processing flows that are indistinguishable from each other (in respect of one or more properties) and create a (virtual) group containing the indistinguishable processing flows. Each group may then be identified by the controller 310 using a respective unique identifier (UID), such as "Flow Group 1", "Flow Group 2", etc.

The controller 310 may also be adapted to associate the identifier of each flow group with a respective topic. Example descriptions of topics may include: "event/topic/1"; "event/topic/2"; and "event/topic/3". Accordingly, the embodiment of FIG. 3 may employ associating messaging topics (e.g. in the form of a topic pattern such as "event/topic/#") with respective flow groups (using unique identifier, UIDs, such as "Flow Group #" for example).

The controller 310 may be adapted to store the associations, or mappings, between flow groups and topics in the database 315. In this way, the database 315 may store information representative of associations between topics with flow group identifiers. For instance, the database 315 may store the information about mappings in the form of one or more look-up tables, lists, tables, etc. Example descriptions of the associations, or mappings may include: "event/topic/1 ' Flow Group 1"; "event/topic/2 ' Flow Group 2"; and "event/topic/3 ' Flow Group 3".

It is noted that, in the example of FIG. 3, the database 315 is illustrated as being provided separately from the controller 310. However, it is to be understood that in other embodiments controller 310 may include the database 315, for example in the form of an internal memory resource.

In response to the occurrence of an event in an application or service, the messaging system 305 may be controlled to publish a message having a topic based on the event and including the identifier of the flow group associated with the topic. The occurrence of an event in an application or service may be detected by identifying at least one of: modification of the application or service; modification of a component or resource; a change in the status of the application or service; and a change in a flow of data to and/or from the application or service. It is envisioned, however, that the controller 310 may be adapted to be aware of any new deployment, changes, or updates, or that there may be an Application Programming Interface (API) server for example through which events are detected and/or reported for the environment. Such components may be aware of changes and may be queried and/or may inform the controller 310.

Thus, a message is published to a message topic (e.g. "event/topic/1"), the message engine 305 may use information passed to from the data storage unit 315 to match the topic with an identifier of the flow group associated with the topic (e.g. "Flow Group 1") and then provide the message and identifier to the flow engine 325.

Based on the message and identifier, the flow engine 325 may then use a processing flow of the flow group having the identifier of the message to process the event. It is also noted that some supplementary (e.g. event) data may be passed to the flow engine within the message so as to provide it with information for facilitating the flow engine, processing execution, event processing etc. Such information may be provided/stored by the data storage unit 315, controller, 310, and/or the messaging engine 305, and may include event details that a processing flow needs to process the event. Accordingly, the flow engine 320 may be adapted to execute a processing flow of the flow group having the identifier of the message, wherein an input to the processing flow is based on at least a portion of message. Thus, the flow engine 320 may pass data of the message to a processing flow of the flow group having the identifier of the message.

By way of example, the flow engine 320 may be adapted to process the event by analyzing the message to determine the identifier included in the message, and may then identify the flow group having the determined identifier.

Although the embodiment of FIG. 3 has been described above as employing message topics that are then used to identify associated flow groups, in one or more other embodiments, a messaging topic may also include identification information of a flow group associated with the message topic. In this way, messages may actually specify a flow group identifier (e.g. ID number). Such identification of a flow group may, for example, indicate a preference or requirement. This may have the advantage of not requiring a message engine to know topic-to-group mappings. Thus, a message employed by embodiments may be configured to include all the information required to provision a flow group and process an event.

It will thus be appreciated that an aspect of present invention is that placement of event processing may be implicitly enforced using a messaging service.

By way of further example, one may consider a system including the following components:

(i) Event detectors: Software components adapted to detect updates to various systems and then publish events over a messaging system.

(ii) Messaging system: A system that may allow connectors (publishers and consumers) to exchange data in a decoupled way. Each message may be published on one of many topics, and all consumers who subscribe to that topic will receive a copy of the message. If consumers belong to the same consumer group, then only one consumer in the group will receive a copy of each message but different messages are shared equally across the group.

(iii) Flow engine: A stateless process which may therefore run many processes concurrently without any contention of resources. Any instance of a flow engine may be capable of running any processing flow if it knows the unique identifier of the flow. For example, it may be able to load a flow document from a shared repository.

One or more embodiments disclosed herein may provide a placement controller that allows the flow engine to be deployed in a highly scalable topology by maintaining a simple registry or store of topics that are used to transmit messages when events occur. Such a placement controller may thus sit between the event detector and the flow engine.

A resultant advantage may be that the flow engines may scale to allow more flows to be deployed by introducing extra compute power in a way that does not interfere with the performance of each processing flow.

Also, each processing flow may scale in a way that allows many messages to be processed concurrently without interfering with the performance of all other message flows in the system.

Turning now to consider the various phases of processing that may be present in one or more embodiments, it is noted that the following three main phases of processing may be identified.

(A) Provisioning

Here, the flow engine 325 may be configured to run a number of processing flows. These may be separated into groups (or flow groups). Each flow group may have an identifier (e.g. "Flow Group n") and within a flow group there may be provided a number of processes that may be indistinguishable from each other. For example, in a Cloud foundry environment, the flow engine 325 may be deployed as several cloud foundry apps and each app may run a number of instances. The flow engine 325 may be implemented such that it is able to dynamically load a processing flow definition when needed (e.g. by calling a GET/flows/{id} Application Programming Interface, API).

For each flow group, a topic may be created on the messaging system 305 (e.g. by calling a POST/topics API). For instance, the topic name may be inferred from the flow group's identifier. In this way, because the topic name may be derived from the identifier and the identifier is known at runtime, the flow engine 325 may be pre-programmed to consume messages from the correct topic.

Also, to improve performance, it may be an option to have many topics for each flow engine group.

(B) Deployment

When a new processing flow is deployed, the placement controller may choose a flow group 320 to be responsible for executing that processing flow. If all current groups are at full capacity, then it may create a new group (e.g. by calling a POST/apps API). The placement of the flow into the group may be enforced by constructing an event detector for that flow (e.g. by calling a POST/streams API) and configuring it with the name of the topic and the unique identifier for the flow. The association/mapping of the processing flow and topic may then be stored in a database so that it can be retrieved later with its unique identifier.

(C) Event Trigger

Upon detection of an event, the event detector may publish a message on the topic (wherein the topic is based on the event). The message may include information about the event (e.g. if a customer has updated their address on a CRM system, then it may include details of the new address). The message may also include the flow identifier that was configured (e.g. associated on with the topic) in the deployment phase.

The flow engine 325 may then receive the event message, extract the flow identifier, look up the processing flow definition and execute the processing flow.

It will thus be understood that one or more embodiments disclosed herein may use a messaging system to transmit a processing flow identifier. This may enable a looking up a processing flow on demand, thereby allowing a flow engine to be completely stateless and therefore highly scalable.

Further, by passing a flow identifier with, or as part of, a message, logical sub-topics may be created, thereby enabling a single topic to be used per flow group (rather than one topic per processing flow). This may therefore reduce cost of the messaging service (which may be charged per topic for example).

In some embodiments, there may be provided a computer program product and a system including a processing arrangement adapted to implement any event processing method or concept previously described with reference to FIGS. 1 to 3.

For instance, according to another embodiment of the present invention, there is provided a computer program product for processing an event of a distributed processing environment, the distributed processing environment including a flow engine adapted to implement a plurality of processing flows. The computer program product comprises a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system including at least one processor and the computer program product according to one or more embodiments. The at least one processor is adapted to execute the computer program code of said computer program product.

According to yet another aspect, there is provided a system for processing an event of a distributed processing environment, the distributed processing environment comprising a flow engine adapted to implement a plurality of processing flows. The system includes a controller adapted to separate the plurality of processing flows in a plurality of flow groups, each flow group having a respective identifier. The controller is also adapted to associate the identifier of each flow group with a respective topic. The system also includes a messaging system adapted to, in response to the occurrence of an event in an application or service, publish a message having a topic based on the event, the message includes the identifier of the flow group associated with the topic. The system further includes a processing arrangement adapted to use a processing flow of the flow group having the identifier of the message to process the event.

Further, in one or more aspects, an event processing system including at least one processor and a computer program product such as noted above may be provided, wherein the at least one processor is adapted to execute computer program code of the computer program product. In such a system, the event processing system may be further adapted to act as a message broker between a message producer and a message consumer. Further, the processing system may be adapted to implement an event manager service in a cloud environment. For instance, the event process system may be adapted to implement a part of a micro-service-oriented architecture.

In one or more further aspects, the above-noted system may be further enhanced by the processing arrangement being adapted to analyze the message to determine the identifier included in the message, and to identify the flow group having the determined message.

Figure 4:
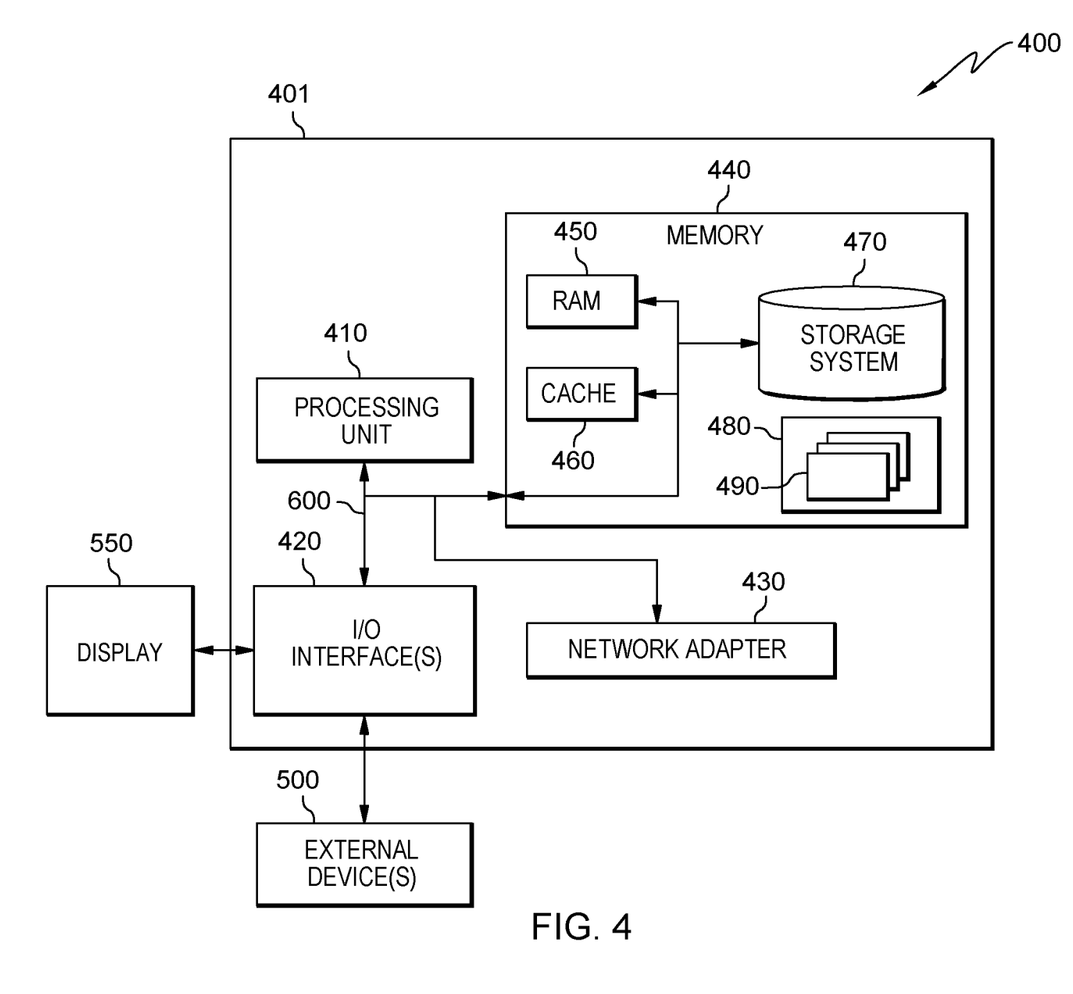
FIG. 4 illustrates a computer system for implementing event processing, according to one or more aspects of the present invention.

By way of example, as illustrated in FIG. 4, embodiments may comprise a computer system 401, which may form part of a networked system 400. The components of computer system/server 401 may include, but are not limited to, one or more processing arrangements, for example comprising processors or processing units 410, a system memory 440, and a bus 600 that couples various system components including system memory 440 to processing unit 410.

Bus 600 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 401 typically includes a variety of computer system readable media. Such media may be any available media that is accessible by computer system/server 401, and it includes both volatile and non-volatile media, removable and non-removable media.

System memory 440 can include computer system readable media in the form of volatile memory, such as random access memory (RAM) 450 and/or cache memory 460. Computer system/server 401 may further include other removable/non-removable, volatile/non-volatile computer system storage media. By way of example only, storage system 470 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 600 by one or more data media interfaces. As will be further depicted and described below, memory 440 may include at least one program product having a set (e.g., at least one) of program modules that are configured to carry out the functions of embodiments of the invention.

Program/utility 480, having a set (at least one) of program modules 490, may be stored in memory 440 by way of example, and not limitation, as well as an operating system, one or more application programs, other program modules, and program data. Each of the operating system, one or more application programs, other program modules, and program data or some combination thereof, may include an implementation of a networking environment. Program modules 490 generally carry out the functions and/or methodologies of embodiments of the invention as described herein.

Computer system/server 401 may also communicate with one or more external devices 500 such as a keyboard, a pointing device, a display 550, etc.; one or more devices that enable a user to interact with computer system/server 401; and/or any devices (e.g., network card, modem, etc.) that enable computer system/server 401 to communicate with one or more other computing devices. Such communication can occur via Input/Output (I/O) interfaces 420. Still yet, computer system/server 401 can communicate with one or more networks such as a local area network (LAN), a general wide area network (WAN), and/or a public network (e.g., the Internet) via network adapter 430. As depicted, network adapter 430 communicates with the other components of computer system/server 401 via bus 600. It should be understood that although not shown, other hardware and/or software components could be used in conjunction with computer system/server 401. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing an update event of a distributed processing environment, the distributed processing environment comprising a flow engine adapted to implement a plurality of processing flows, the method comprising:
    separating the plurality of processing flows into a plurality of flow groups, each flow group having a respective identifier;
    associating the identifier of each flow group with a respective topic;
    based on detecting the occurrence of an update event in an application or service of the distributed processing environment, publishing a message to a topic based on the update event;
    based on the publishing, matching, by a messaging engine, the message topic with an identifier of the flow group associated with the topic, the matching being with reference to a database of mappings between flow groups and topics;
    based on the matching, by the messaging engine, providing the message and identifier to the flow engine, wherein the messaging engine and the flow engine are separate engines; and
    processing by the flow engine the update event using a processing flow of the flow group having the identifier of the message, wherein the flow engine is stateless and scalable, and able to run multiple processing flows concurrently.

2. The method of claim 1, wherein using the processing flow of the flow group having the identifier of the message to process the update event comprises:
    analyzing the message to determine the identifier included in the message; and
    identifying the flow group having the determined identifier.

3. The method of claim 1, wherein using the processing flow of the flow group having the identifier of the message to process the update event comprises:
    executing a processing flow of the flow group having the identifier of the message, wherein an input to the processing flow is based on at least a portion of message.

4. The method of claim 3, wherein the at least a portion of the message comprises information relating to the update event.

5. The method of claim 1, wherein using the processing flow of the flow group having the identifier of the message to process the update event comprises:
    passing data of the message to a processing flow of the flow group having the identifier of the message.

6. The method of claim 1, wherein associating the identifier of each flow group with a respective topic comprises:
    for each flow group, generating a topic based on the identifier of the flow group and registering the generated topic and the flow group with the messaging engine.

7. The method of claim 1, further comprising detecting the occurrence of the update event in an application or service by identifying at least one of:
    modification of the application or service;
    modification of a component or resource;
    a change in the status of the application or service; and
    a change in a flow of data to and/or from the application or service.

8. The method of claim 1, wherein the processing flow of the flow group comprises a micro-service.

9. A computer program product for processing an update event of a distributed processing environment, the distributed processing environment comprising a flow engine adapted to implement a plurality of processing flows, the computer program product comprising:
    a non-transitory computer readable storage medium having program instructions embodied therewith, the program instructions executable by a processing unit to cause the processing unit to perform a method comprising:

separating the plurality of processing flows in a plurality of flow groups, each flow group having a respective identifier;

associating the identifier of each flow group with a respective topic;

based on detecting the occurrence of an update event in an application or service of the distributed processing environment, publishing a message to a topic based on the update event;

based on the publishing, matching, by a messaging engine, the message topic with an identifier of the flow group associated with the topic, the matching being with reference to a database of mappings between flow groups and topics;

based on the matching, by the messaging engine, providing the message and identifier to the flow engine, wherein the messaging engine and the flow engine are separate engines; and processing by the flow engine the update event using a processing flow of the flow group having the identifier of the message, wherein the flow engine is stateless and scalable, and able to run multiple processing flows concurrently.

10. The computer program product claim 9, wherein using the processing flow of the flow group having the identifier of the message to process the update event comprises:

analyzing the message to determine the identifier included in the message; and identifying the flow group having the determined identifier.

11. The computer program product of claim 9, wherein using the processing flow of the flow group having the identifier of the message to process the update event comprises:

executing a processing flow of the flow group having the identifier of the message, wherein an input to the processing flow is based on at least a portion of message.

12. The computer program product of claim 11, wherein the at least a portion of the message comprises information relating to the update event.

13. The computer program product of claim 9, wherein using the processing flow of the flow group having the identifier of the message to process the update event comprises:

passing data of the message to a processing flow of the flow group having the identifier of the message.

14. The computer program product of claim 9, wherein associating the identifier of each flow group with a respective topic comprises:

for each flow group, generating a topic based on the identifier of the flow group and registering the generated topic and the flow group with the messaging engine.

15. The computer program product of claim 9, further comprising detecting the occurrence of the update event in an application or service by identifying at least one of:

modification of the application or service;

modification of a component or resource;

a change in the status of the application or service; and a change in a flow of data to and/or from the application or service.

16. A system for processing an update event of a distributed processing environment, the distributed processing environment comprising a flow engine adapted to implement a plurality of processing flows, the system comprising:

a memory; and a processor communicatively coupled to the memory, wherein the system performs a method comprising:

separating the plurality of processing flows into a plurality of flow groups, each flow group having a respective identifier;

associating the identifier of each flow group with a respective topic;

based on detecting the occurrence of an update event in an application or service of the distributed processing environment, publishing a message to a topic based on the update event;

based on the publishing, matching, by a messaging engine, the message topic with an identifier of the flow group associated with the topic, the matching being with reference to a database of mappings between flow groups and topics;

based on the matching, by the messaging engine, providing the message and identifier to the flow engine, wherein the messaging engine and the flow engine are separate engines; and processing by the flow engine the update event using a processing flow of the flow group having the identifier of the message, wherein the flow engine is stateless and scalable, and able to run multiple processing flows concurrently.

17. The system of claim 16, wherein using the processing flow of the flow group having the identifier of the message to process the update event comprises:

analyzing the message to determine the identifier included in the message; and identifying the flow group having the determined identifier.

18. The system of claim 16, wherein using the processing flow of the flow group having the identifier of the message to process the update event comprises:

executing a processing flow of the flow group having the identifier of the message, wherein an input to the processing flow is based on at least a portion of message.

19. The system of claim 18, wherein the at least a portion of the message comprises information relating to the update event.

20. The system of claim 16, wherein using the processing flow of the flow group having the identifier of the message to process the update event comprises:

passing data of the message to a processing flow of the flow group having the identifier of the message.

* * * * *